Oct. 9, 1928.

E. RITTER

COMBINATION GAS AND OIL BURNER

Filed Sept. 27, 1927

WITNESSES

INVENTOR
Eugene Ritter
BY
ATTORNEY

Oct. 9, 1928.

E. RITTER 1,687,390

COMBINATION GAS AND OIL BURNER

Filed Sept. 27, 1927

INVENTOR
Eugene Ritter
BY
ATTORNEY

Patented Oct. 9, 1928.

1,687,390

UNITED STATES PATENT OFFICE.

EUGENE RITTER, OF MONROE, LOUISIANA.

COMBINATION GAS AND OIL BURNER.

Application filed September 27, 1927. Serial No. 222,342.

This invention relates to a combination gas and oil burner.

An object of the invention is to provide a combination burner of this character in which the gas is caused to burn at the ends of a circular series of nozzles surrounding an oil burner located centrally with relation to the series of gas nozzles.

A further object is to provide a combination burner of this type in which air is admitted to an air casing surrounding the gas casing and nozzles, and air is admitted to the oil burner casing in the proportion desired and under the control of a series of dampers.

With these and other objects in view, the invention consists in certain novel features of construction and combinations and arrangements of parts, which will be more fully hereinafter described and pointed out in the claims.

In the accompanying drawings—

Figure 1:
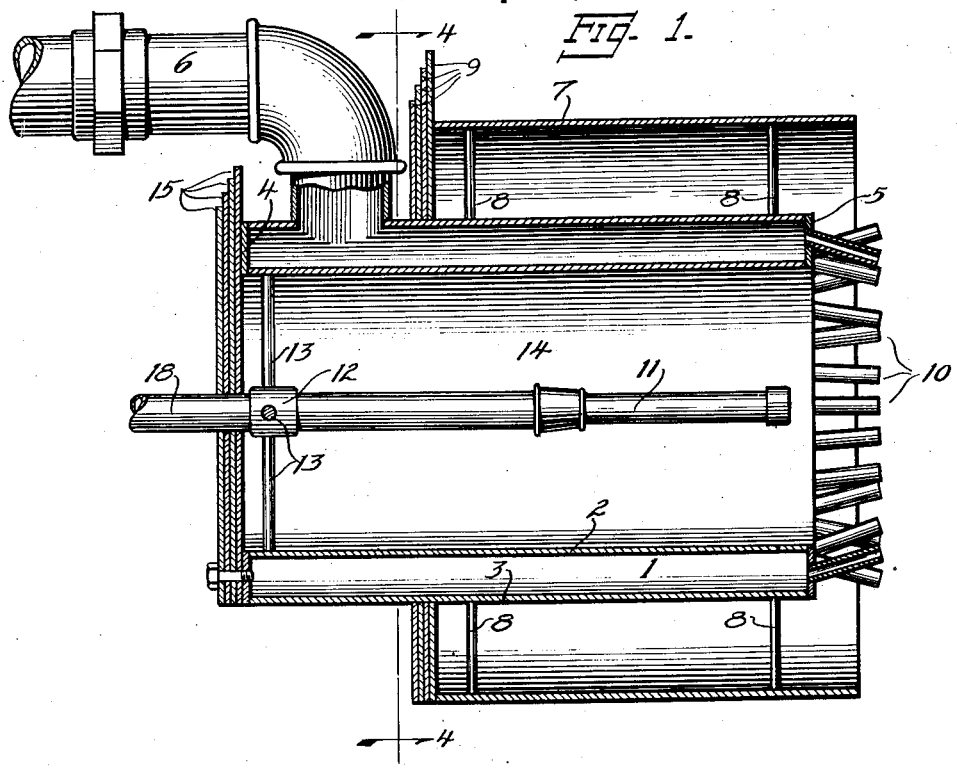
Figure 1 is a view in longitudinal section through my improved combination burner.
Figure 2:
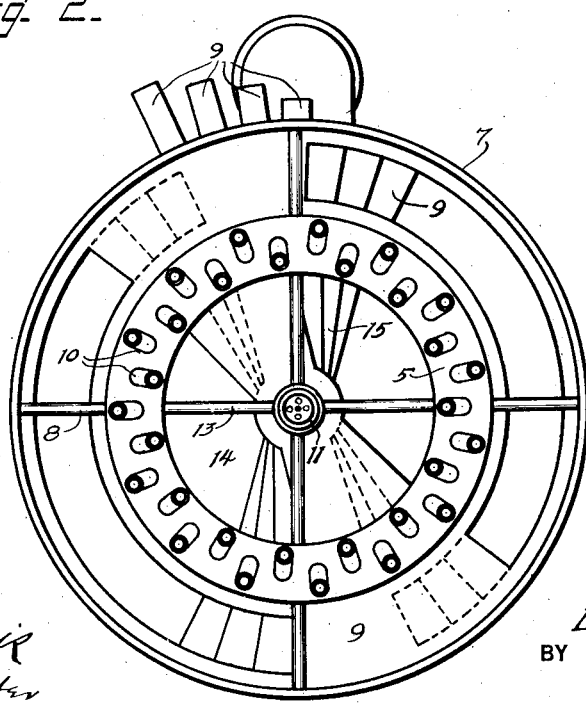
Figure 2 is a front end view of the burner.
Figure 3:
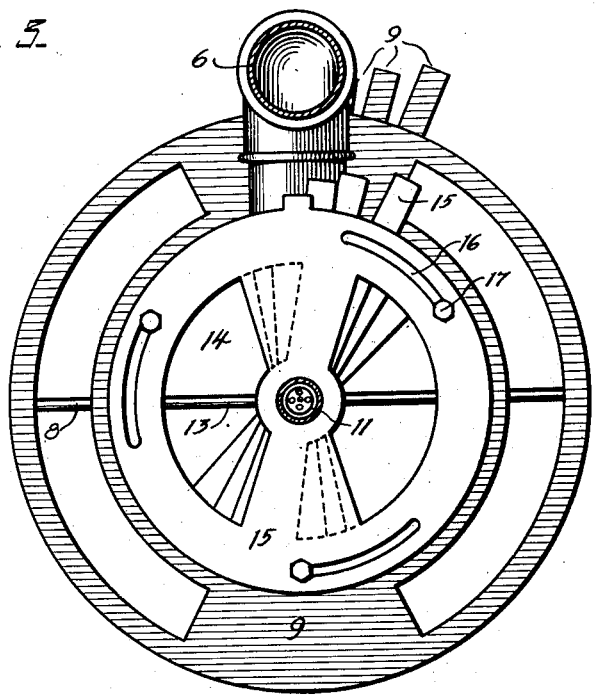
Figure 3 is a rear end view of the burner.
Figure 4:
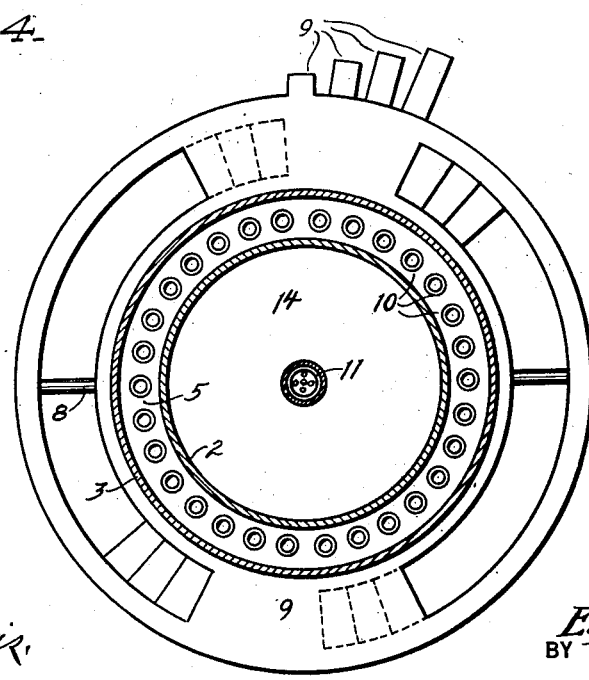
Figure 4 is a view in transverse section on the line 4—4 of Figure 1.

1 represents a gas casing which is composed of two concentric cylinders 2 and 3 of different diameters, spaced apart and fixedly connected at their ends by rings 4 and 5, so that said gas casing comprises an annular chamber to which gas is admitted by a pipe 6 from any desired source and under any desired pressure.

Around the outside and forward end of the gas casing 1 an air casing 7 is located. This casing 7 is of appreciably greater diameter than the gas casing and projects beyond the forward end of the gas casing and is appreciably shorter than the gas casing and is open at its free end. Spacers 8 connect the air casing with the gas casing and hold the parts in proper relationship.

The inner end of the air casing 7 is closed by a series of dampers 9 which turn on the gas casing and which may be variously positioned in order to admit air and to dispose the air inlet openings as desired.

On the forward end of the gas casing 1 a circular series of burner nozzles 10 are provided. These burner nozzles 10 are preferably angularly disposed, the alternate nozzles inclined inwardly and the other nozzles inclined outwardly so as to spread the flame issuing from the combined nozzles 10.

Located centrally within the cylindrical wall 2, constituting the inner wall of the gas casing 1, I locate an oil burner nozzle 11 secured to an oil supply pipe 18. The forward end of the nozzle terminates adjacent the forward end of the gas casing and the flame issuing therefrom is centrally disposed relatively to the series of flames or jets issuing from the gas nozzles 10. This oil burner nozzle 11 may of course be made in any desired way, constituting such improved construction as may be desired, and is held rigidly in place by means of a collar 12 secured around the oil pipe 18 and connected by spacers or rods 13 with the inner wall 2 of gas casing 1.

The space or chamber 14 formed by the inner wall 2 of gas casing 1 is open at both ends, the inner end being closed by a series of dampers 15. Each of these dampers 15 constitutes rings or disks having slots 16 therein receiving bolts or studs 17 on the end of the gas casing 1 to limit their turning movement, and said dampers are of double fan shape and turn freely around the oil supply pipe 18 which is connected to and forms a part of the oil nozzle 11.

It will thus be noted that my improved combination burner comprises a central casing to which air is admitted and in which an oil burner is provided. The gas casing surrounds the oil burner chamber, and an air casing around the gas casing, the dampers being provided to control the admission of air and the gas burner nozzles arranged in a circular series with the oil burner arranged centrally with relation to the gas burner so that the flame from the oil burns with a series of gas flames around the same.

While I have illustrated what I believe to be a preferred embodiment of my invention, it is obvious various changes and alterations might be made in the general form of the parts described without departing from my invention and hence I do not limit myself to the precise details set forth but consider myself at liberty to make such changes and alterations as fairly fall within the spirit and scope of the appended claims.

I claim:

1. A combination burner of the character described, including an annular gas casing, a circular series of nozzles at one end of the gas casing, certain of said nozzles inclining inward and others of said nozzles inclining outwardly, an oil burner located centrally relative to the series of gas burner nozzles, an air casing around the gas casing, and means controlling the admission of air to said casing.

2. A combination burner of the character described, including an annular gas casing, a circular series of nozzles at one end of the gas casing, certain of said nozzles inclining inwardly and others of said nozzles inclining outwardly, an oil burner located centrally relatively to the series of gas burner nozzles, an air casing around the gas casing, means controlling the admission of air to said casing, said air casing projecting beyond the forward end of the gas casing and partially enclosing the series of gas burner nozzles.

Signed at Monroe, in the parish of Ouachita and State of Louisiana, this 21 day of Sept., A. D. 1927.

EUGENE RITTER.